May 23, 1950   J. B. SEBOK   2,508,543
VIBRATORY HOPPER WITH FEED WHEEL
Filed Sept. 7, 1944   2 Sheets-Sheet 2
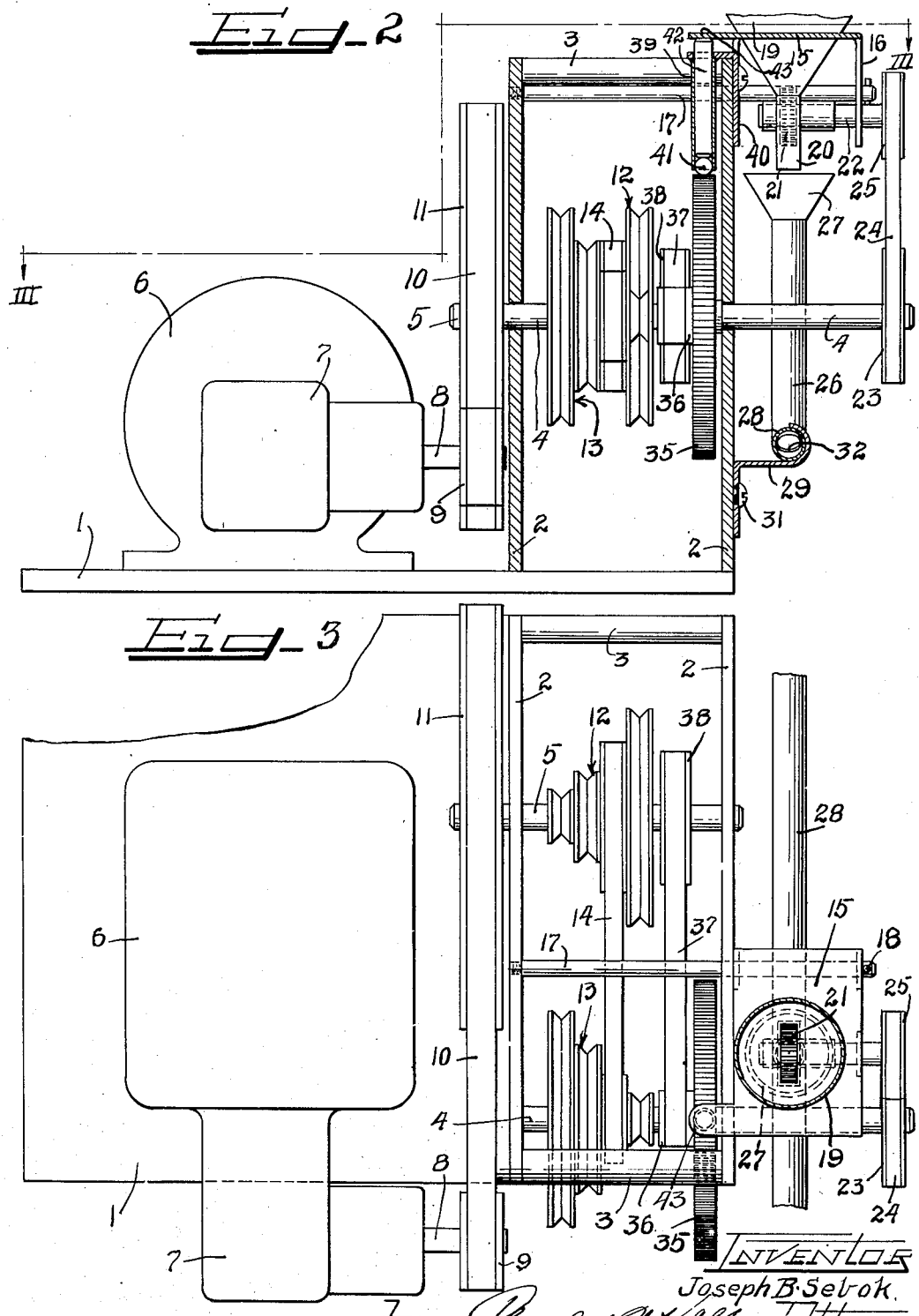

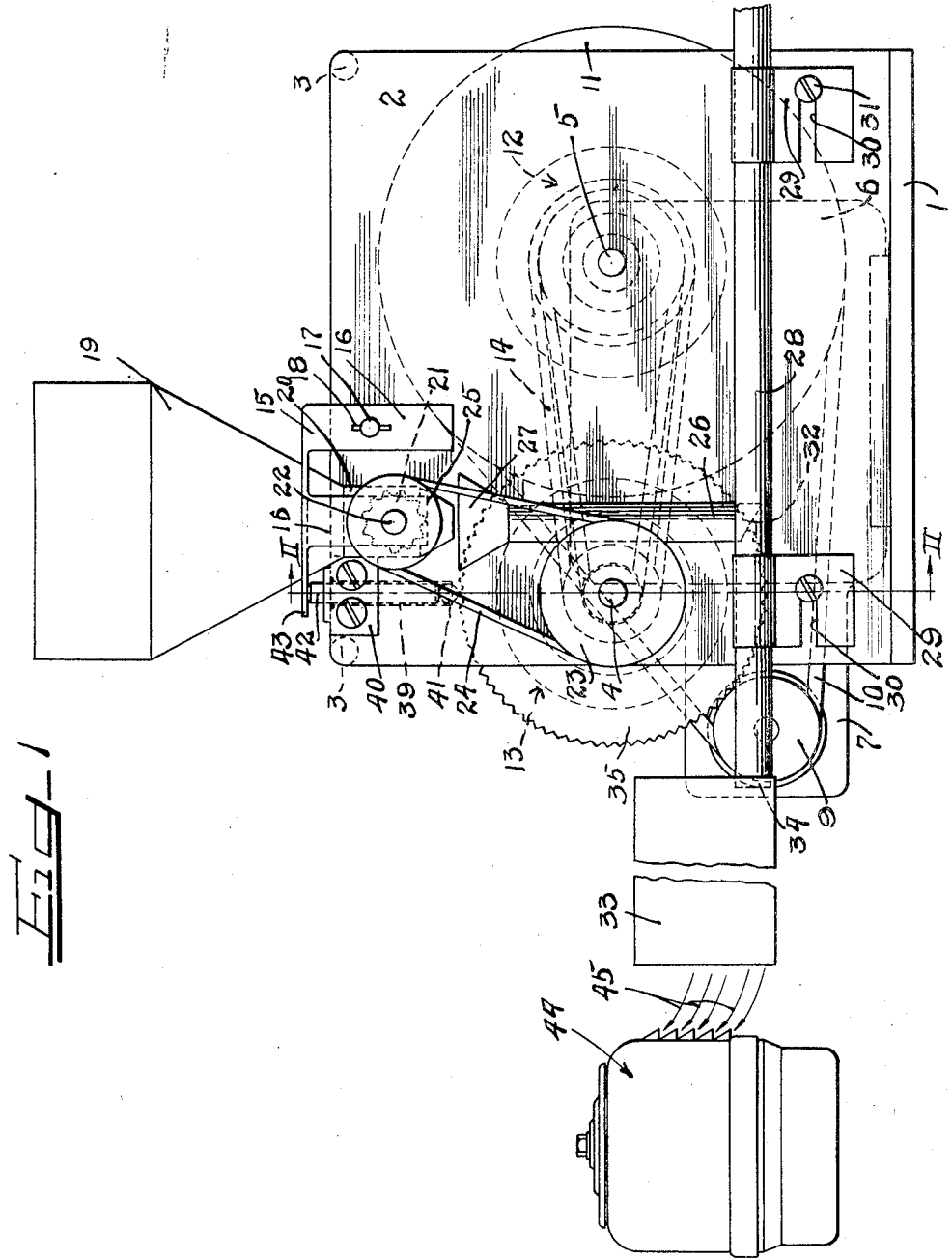

Patented May 23, 1950

2,508,543

UNITED STATES PATENT OFFICE 2,508,543

VIBRATORY HOPPER WITH FEED WHEEL

Joseph B. Sebok, Detroit, Mich., assignor to Houdaille-Hershey Corporation, Detroit, Mich., a corporation of Michigan Application September 7, 1944, Serial No. 553,004

3 Claims. (Cl. 222—161)

This invention relates to improvements in dust feeding apparatus, and more particularly to apparatus for feeding a predetermined amount of dust, powder, comminuted material, or the like, although the invention may have other uses and purposes as will be apparent to one skilled in the art.

In the past, difficulty has been experienced in supplying a predetermined quantity of dust, powder, or finely comminuted material to some apparatus undergoing test or to be supplied with such material. For example, in various test runs of filters, air cleaners, and similar equipment, it is essential to supply the dust or dirt in a proper amount over a specified period of time in order to ascertain the efficiency of the device under test. Considerable difficulty has been heretofore experienced in the supply of dust or dirt to air cleaners under test in that the proper amount could not be supplied within the proper time, and in many cases it was almost impossible to ultimately determine just how much of the initial amount had been supplied to the air cleaner and how much had been lost during the attempt to supply it to the air cleaner under test.

With the foregoing in mind, it is an important object of the instant invention to provide apparatus capable of delivering accurately a predetermined amount of dust within a predetermined time.

Another object of the invention is the provision of apparatus for feeding dust, or similar fine material, and embodying a mechanical feeding means capable of delivering a uniform amount consistently.

Still another object of the instant invention is the provision of a feeding apparatus for supplying dust or other fine material in which a portion of the apparatus is subjected to vibration or agitation to insure uniform feeding.

It is also an object of this invention to provide a feeding apparatus of the character set forth herein in which a part of the apparatus is agitated to insure uniform feeding, and in which the rate of speed may be changed at will without changing the rate of agitation.

A further feature of the invention resides in the provision of a feeding apparatus of the character set forth herein which embodies a feed tube and the structure is so arranged that that feed tube is automatically kept clean and free from any accumulation of the dust or other fine matter passing therethrough during the operation of the apparatus.

Still another feature of the invention resides in the provision of a feeding apparatus of the character set forth herein embodying a delivery tube for the dust or other finely comminuted material being fed and a diffuser into which the delivery tube discharges the material, the diffuser and the delivery tube being so arranged as to prevent entrapment of fed material within the diffuser.

Still another object of the instant invention resides in the provision of a dust feeding apparatus embodying a plurality of sub-assemblies which directly handle the dust being fed, these sub-assemblies being readily removable from the main portion of the structure so as to permit weighing of the sub-assemblies before and after test runs.

While some of the more salient features, characteristics and advantages of the instant invention have been above pointed out, others will become apparent from the following disclosures, taken in conjunction with the accompanying drawings, in which Figure 1 is a fragmentary side elevational view of a dust feeding apparatus embodying principles of the instant invention, showing the same associated in operative relationship with an air cleaner undergoing test;

Figure 2 is a transverse vertical sectional view through the apparatus taken substantially as indicated by the section line II—II of Figure 1, looking in the direction of the arrows; and Figure 3 is a fragmentary plan sectional view taken substantially as indicated by the line III—III on Figure 2.

As shown on the drawings:

At the outset, it should be understood that where the term "dust" is used herein and in the appended claims, the same is to be considered as synonymous with and including powder, comminuted material, and similar fine particle substances.

The illustrated embodiment of the instant invention includes a base 1 upon which is disposed a frame structure comprising a pair of spaced vertically disposed supporting plates 2—2 held in such position by suitable spacing elements 3. The frame members 2—2 provide a suitable bearing support for a pair of spaced shafts 4 and 5. These shafts carry the drive transmitting means for the motive parts of the apparatus.

Mounted on the base 1 is a suitable prime mover such as an electric motor 6 which may be provided with a suitable gearbox 7, if so desired. From the gearbox a drive shaft 8 extends on the outer end of which is a pulley 9 drivingly connected through a belt 10 to a relatively large pulley 11 on the shaft 5. Consequently, the shaft 5 is driven by the shaft 8 but at a slower speed.

The shaft 5 in turn drives the shaft 4. This is accomplished by means of a stepped pulley arrangement 12 keyed to the shaft 5, and a similar but oppositely disposed stepped pulley arrangement 13 keyed to the shaft 4. A suitable belt 14 is trained over corresponding segments of the stepped pulleys 12 and 13, depending upon what speed of rotation is desired from the shaft 4. Obviously, the speed of rotation of the shaft 4 may be changed at will by the operator, by the simple expedient of shifting the belt 14 to different steps of the respective pulleys.

Near the top of the outer frame member 2 a sub-assembly is removably mounted. This sub-assembly includes a frame 15 having a leg 16 thereon pivotally associated with a fixed transverse supporting rod 17, a removable pin 18 in the end of the rod maintaining the frame in position. The frame 15 carries a hopper 19 into which the dust to be fed may be initially placed in any suitable manner. This hopper has a tubular discharge nozzle 20 inside of which is a toothed wheel 21 carried on a shaft 22 journalled in a part of the frame 15. The shaft 22 and consequently the wheel 21 is rotated from the shaft 4 by means of a pulley 23, a belt 24, and a pulley 25 secured to the outer end of the shaft 22. It is therefore apparent that the feeding wheel 21 rapidly dumps successive small portions of dust deposited by gravity in the notches in the wheel.

The dust so fed by the wheel 21 gravitates through a feeding tube 26 having a flared receiving end 27. This feeding tube 26 is a part of another removably mounted sub-assembly which includes a transversely disposed delivery tube 28 fixedly carried in a pair of angular brackets 29 each of which has a suitable slot 30 therein for engagement over the shank of a bolt 31 by means of which the brackets may be attached to a frame member 2. With reference to Figures 1 and 2, it will be noted that the feeding tube 26 has its lower end cut off obliquely and extends within the delivery tube 28. The oblique end 32 on the feed tube is so arranged that the closed side thereof extends preferably over half way through the delivery tube in a transverse direction. The delivery tube is designed to be connected to a source of air under relatively light pressure, and the disposition of the end of the feed tube inside the delivery tube is such that there will be a Venturi effect, thus creating a suction tending to keep the feed tube 26 free of dust at all times. In other words, the feed tube 26 is automatically cleansed by the air passing through the delivery tube. This air under pressure carries the dust from the feed tube 26 through the delivery tube to a diffuser 33 which is of considerably larger diameter than the delivery tube. With reference to Figure 1, it will be noted that the end of the delivery tube enters the diffuser, as indicated at 34, almost at the bottom of the diffuser and does not extend very far into the diffuser, so as to eliminate any pockets for the undesired entrapment of dust delivered to the diffuser.

In order to insure an even delivery of the dust, that is a predetermined amount within a predetermined time depending upon the speed of operation of the feeding wheel 21, the hopper 19 is preferably vibrated or agitated constantly during operation of the apparatus. In order to effect this agitation, a relatively large wheel 35 having a toothed or serrated rim is freely disposed on the shaft 4. That is, this wheel 35 together with a pulley 36 fixed to the wheel floats on the shaft 4. The pulley 36 and wheel 35 are rotated by means of a belt 37 on a pulley 38 fixed to the shaft 5. A tubular guide element 39 carried by a bracket 40 attached to the outer frame member 2 has a ball 41 freely disposed in its lower open end to ride upon the serrated rim of the wheel 35. Resting upon the ball inside the tubular guide is a rod 42, and the upper end of this rod is disposed beneath a projecting portion 43 of the aforesaid pivotally mounted frame 15. As the wheel 35 rotates, therefore, the ball 41 and rod 42 are agitated by the serrations on the rim of the wheel, and this agitation is transmitted through the frame 15 to the hopper 19 so that the dirt within the hopper is constantly caused to gravitate downwardly upon the feed wheel 21.

It will be noted that regardless of the speed of operation of the feed wheel 21, which may be varied by shifting the belt 14 along the different steps of the pulleys 12 and 13 as above explained, the speed of agitation of the hopper always remains constant by virtue of the fact that the wheel 35 floats on the shaft 4 and rotates at a constant speed regardless of the speed of the shaft.

In use, for example in the testing of an air cleaner, the feeding apparatus may be disposed so that dust from the diffuser 33 will enter the inlet openings of an air cleaner, generally indicated by numeral 44, as shown by the arrows 45 in Figure 1. The dust is caused to leave the diffuser and enter the air cleaner by virtue of the suction created inside the air cleaner, from the apparatus to which the air cleaner is connected. In so making a test of an air cleaner, a predetermined quantity of dust is placed in the hopper 19. The motor 6 may then be started and the feed wheel 21 begins dropping dust into the feed pipe 26. While the feed wheel is operating, the frame 15 carrying this wheel as well as the hopper is constantly agitated to insure an adequate supply of dust on the feed wheel. From any suitable source, a light blast of air is carried through the delivery pipe 28 toward the diffuser 33. The dust entering the feed pipe 26 is transmitted to the delivery pipe 28 both by gravity and by virtue of the suction created by the air traveling through the pipe 28. This dust is delivered into the diffuser 33, and from there it is sucked into the inlet opening of the air cleaner. After the hopper is empty, the amount of dust collected in the air cleaner may be determined. That amount should be substantially all of the dust that was originally placed in the hopper. By virtue of the air traveling through the pipe 28, the feeding tube 26, and the pipe 28 are automatically cleansed of the dust that traveled therethrough. However, in order to insure an accurate test, the sub-assembly including the frame 15, the feed wheel 21 and the hopper 19 is removed by the simple expedient of withdrawing the pin 18 and lifting the sub-assembly laterally off the rod 17 after releasing the belt 24. This entire sub-assembly may then be carefully weighed, and its weight checked with the weight of the same sub-assembly before the operation. Thus, it may be determined what amount of dust, if any, lodged in this sub-assembly instead of being delivered to the air cleaner. In like manner, the other sub-assembly including the feed tube 26, the delivery tube 28, and the diffuser 33 may be removed, and its after weight checked with its weight before the test was started. Whatever dust may have remained in the feeding apparatus at the end of the test may then be subtracted from the amount of dust originally placed in the hopper and that result utilized in calculating the efficiency of the air cleaner.

From the foregoing, it is apparent that I have provided a feeding apparatus which is simple but highly efficient in operation, and is capable of delivering a predetermined amount of dust, powder, or other finely comminuted material within a predetermined length of time, such delivery being steady, uniform, and accurate. Further, the device lends itself to the accurate determination of the efficiency of some object undergoing a test by the fact that sub-assemblies may be removed from the device and weighed before and after test runs. It will also be appreciated that the device is highly durable, capable of long life, and may be easily cleansed in the event it is desired to change materials to be fed.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a dust feeding apparatus, a supporting frame, driving means on said frame, a sub-assembly including a supply hopper and a motive feed element carried by a sub-frame pivotally connected to said supporting frame for free movement bodily relatively to the supporting frame, said feed element being actuated by said driving means, and agitating means actuated by said driving means and carried on said supporting frame in contact with said sub-frame, said driving means being arranged to permit variance in the speed of said feed element while the speed of said agitating means remains constant.

2. In a dust feeding apparatus, a supply hopper, motive feeding means associated with the outlet of said supply hopper, a toothed wheel adjacent said hopper, and means connected to said hopper and freely riding the toothed surface of said wheel to agitate said hopper, the last said means including a tubular guide, a ball in the lower portion of said guide freely riding on said wheel and a rod freely resting on said ball.

3. In a dust feeding apparatus, a supply hopper, motive feeding means associated with the outlet of said supply hopper, pivoted means supporting said hopper, a toothed wheel adjacent said hopper, a fixed tubular guide, a ball held by said guide and freely riding on the toothed part of said wheel, and a rod resting on said ball and abutting a portion of said pivoted means to agitate the same and said hopper.

JOSEPH B. SEBOK.

REFERENCES CITED

The following references are of record in the file of this patent:

UNITED STATES PATENTS

| Number | Name | Date |
|---|---|---|
| 83,782 | Morgan | Nov. 3, 1868 |
| 397,215 | Ballard | Feb. 5, 1889 |
| 420,385 | Horan | Jan. 28, 1890 |
| 423,121 | Brown | Mar. 11, 1890 |
| 468,868 | Fickett | Feb. 16, 1892 |
| 749,300 | Kemp | Jan. 12, 1904 |
| 887,247 | Geiger | May 12, 1908 |
| 1,090,120 | Scott | Mar. 10, 1914 |
| 1,174,141 | Giesen et al. | Mar. 7, 1916 |
| 1,292,004 | Miller | Jan. 21, 1919 |
| 1,473,757 | Dorsey | Nov. 13, 1919 |
| 1,641,149 | Bernert | Sept. 6, 1927 |
| 1,662,529 | McKinley | Mar. 13, 1928 |
| 1,724,113 | Small | Aug. 13, 1929 |
| 1,754,121 | Sammis | Apr. 8, 1930 |
| 1,875,036 | Leake | Aug. 30, 1932 |
| 1,880,452 | Hulslander | Oct. 4, 1932 |
| 2,099,315 | Prochazka | Nov. 16, 1937 |
| 2,164,483 | Watson | July 4, 1939 |
| 2,228,371 | Shaw | Jan. 14, 1941 |
| 2,262,879 | Beckey | Nov. 18, 1941 |
| 2,265,720 | Daniels | Dec. 9, 1941 |